United States Patent Office.

IRVING W. SCRANTON, OF WEST LIBERTY, IOWA.

Letters Patent No. 82,038, dated September 8, 1868.

IMPROVED MEDICAL COMPOUND.

*The Schedule referred to in these Letters Patent and making part of the same.*

TO ALL WHOM IT MAY CONCERN:

Be it known that I, IRVING W. SCRANTON, of the town of West Liberty, and county of Muscatine, in the State of Iowa, have invented certain new and useful Improvements in Medicines for Treating Cholera; and I do hereby declare that the following is a full, clear, and exact description and recipe thereof.

To enable others to make and use my invention, I will proceed to describe it:

Chloroform, one ounce.
Essence Jamaica ginger, one ounce.
Essence peppermint, one ounce.
Essence cinnamon, one ounce.
Compound spirits lavender, one ounce.
Spirits camphor, one ounce.
Tincture opium, half an ounce.
Simple sirup, fifteen ounces.
Arnica, one and a half ounce.

The above proportions of ingredients make just twenty-three ounces of medicine.

What I claim as my invention, and desire to secure by Letters Patent, is—

The above improved compound for the treatment of cholera in any of its stages.

IRVING W. SCRANTON.

Witnesses:
GEO. W. CLAPPER,
P. R. EVANS.